United States Patent Office 2,785,197
Patented Mar. 12, 1957

2,785,197

PREPARATION OF TRICHLOROMETHANE-PHOSPHONIC ACID

John L. Van Winkle, San Lorenzo, Calif., assignor to Shell Development Company, New York, N. Y., a corporation of Delaware No Drawing. Application June 18, 1954,
Serial No. 437,860

19 Claims. (Cl. 260—500)

This invention pertains to a method for preparing trichloromethanephosphonic acid. More particularly, the invention pertains to a method for preparing trichloromethanephosphonic acid by hydrolysis of trichloromethanephosphonic dichloride.

Trichloromethanephosphonic acid and certain of its derivatives, especially certain of its salts and esters, have been found to be of value in formulating improved lubricants, such as improved extreme pressure lubricants, and cutting oils. Considerable difficulty has been experienced, however, in preparing the acid. Also, as produced heretofore, the acid has been obtained in the form of a monohydrate. As far as is known, the crystalline, anhydrous acid, $CCl_3P(O)(OH)_2$, has not been prepared heretofore.

One proposed method for preparing the acid has been by pyrolysis of lower dialkyl trichloromethanephosphonates. In addition to the necessity for first preparing the esters, this method suffers from the disadvantages that the pyrolysis yields a mixture of materials which is not amenable to purification and the yields are undesirably low.

Yakubovich, Ginsburg, and Makarov, Doklady Akademii Nauk S. S. S. R. 71, 303–5 (1950); and Yakubovich and Ginsburg, Doklady Akademii Nauk S. S. S. R. 82, 273–6 (1952) have observed the rather remarkable resistance to hydrolysis that is displayed by the monochloride of trichloromethanephosphonic acid,

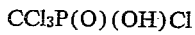
$CCl_3P(O)(OH)Cl$ and, indeed, have concluded that this compound is completely resistant to hydrolysis.

In the experiments of these authors hydrolysis of trichloromethanephosphonic dichloride led to the formation of this stable monochloride as the hydrolysis product. Only by heating the monochloride with hydrochloric acid at 150° C. in a sealed ampule was the chlorine on the phosphorus atom replaced by hydroxyl. The work of these authors thus indicates at best a two-step process to convert trichloromethanephosphonic dichloride to trichloromethanephosphonic acid, with the further disadvantage of need for high pressure equipment in the second step of the process.

It also was observed by these same authors that the trichloromethanephosphonic acid, whether produced from the trichloromethanephosphonic acid monochloride or by saponification of dialkyl trichloromethanephosphonates, was obtained in the form of a monohydrate rather than as the anhydrous acid. Attempts to remove the water of hydration by heating and even by such mild treatment as prolonged drying over $P_2O_5$ led to anhydridization of the acid rather than to removal only of the water of hydration. Heretofore this unusual propensity of the acid to anhydridize appears to have precluded preparation of trichloromethanephosphonic acid per se,

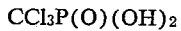
$CCl_3P(O)(OH)_2$

One of the objects of the present invention is a practical method for the preparation of trichloromethanephosphonic acid. Another object of the invention is a method for preparing trichloromethanephosphonic acid directly by hydrolysis of trichloromethanephosphonic dichloride. A further object of the invention is a method in which trichloromethanephosphonic dichloride is hydrolyzed by reaction of water with a solution of trichloromethanephosphonic dichloride in an inert water-immiscible solvent therefor. Another important object of the invention is a method for preparing trichloromethanephosphonic acid per se from trichloromethanephosphonic acid monohydrate. Other objects of the invention will become apparent from the following description and the accompanying claims.

It now has been unexpectedly discovered that by reacting trichloromethanephosphonic dichloride in solution in an inert water-immiscible organic solvent therefor with water present in admixture with the solution as a separate, immiscible liquid phase, the trichloromethanephosphonic dichloride can be easily converted directly to trichloromethanephosphonic acid. In this manner, the hydrolysis can be brought about in a single step, rapidly, in virtually quantitative yields, and with none of the disadvantages attendant to the prior art processes.

More specifically, it has been found that trichloromethanephosphonic acid can be prepared by heating with at least two molar proportions of water a solution of one molar proportion of trichloromethanephosphonic dichloride in an inert water-immiscible organic solvent for trichloromethanephosphonic dichloride, the water and the water-immiscible solution being present in such proportions that there is at least initially an inhomogeneous reaction mixture comprising the solution of trichloromethanephosphonic dichloride in the water-immiscible solvent therefor, and water, and continuing the heating until trichloromethanephosphonic acid has been produced from the trichloromethanephosphonic dichloride.

According to one embodiment of the invention, a solution of one molar equivalent of trichloromethanephosphonic dichloride in an inert water-immiscible organic solvent is heated in admixture with at least two molar proportions of water, present as a separate inhomogeneous phase, until the desired conversion to trichloromethanephosphonic acid has occurred. The aqueous phase, comprising an aqueous solution of hydrochloric acid and trichloromethanephosphonic acid monohydrate, and the organic phase, comprising the inert water-immiscible organic solvent, then are separated and the trichloromethanephosphonic acid is recovered.

According to another embodiment of the invention, a solution of trichloromethanephosphonic dichloride and an inert water-immiscible volatile organic solvent therefor are mixed and the hydrolysis is conducted at least initially with the trichloromethanephosphonic dichloride in solution in the water-immiscible solvent. As the reaction progresses, the solvent is removed by volatilization from the reaction mixture so that there remains upon completion of the hydrolysis an aqueous mixture comprising trichloromethanephosphonic acid monohydrate dissolved or suspended in an aqueous solution of hydrochloric acid.

According to a third embodiment of the invention, the hydrolysis of trichloromethanephosphonic dichloride is carried out by reacting with at least the stoichiometrically required amount of water a solution of trichloromethanephosphonic dichloride in an inert water-immiscible organic solvent which forms a ternary azeotrope with water and hydrogen chloride. The hydrolysis is continued in the presence of the water-immiscible organic solvent by heating until trichloromethanephosphonic acid is formed, and thereafter water, hydrogen chloride and a part of the organic solvent are volatilized together from the resulting mixture to leave a solution of anhydrous trichloromethanephosphonic acid, CCl₃P(O)(OH)₂, in the remaining portion of the organic solvent. This solution then is cooled to precipitate anhydrous trichloromethanephosphonic acid from it, typically in the form of fine white crystals from which occluded solvent can be easily removed by drying.

The trichloromethanephosphonic acid produced by the process of the invention typically is a white crystalline solid melting at about 163.2° C. It is soluble in water and alcohols but is nearly insoluble in low molecular weight hydrocarbons at room temperatures. The acid is rather hygroscopic, forming the monohydrate upon extensive exposure to atmospheric moisture. The monohydrate melts at about 87° C.

For carrying out the hydrolysis of the trichloromethanephosphonic dichloride in solution in a solvent therefor, the solvent may be in general, any inert, relatively low-boiling, water-immiscible organic solvent, such as carbon tetrachloride, benzene, toluene, chloroform, tetrachloroethane, ethylene chloride, propylene chloride, chlorobenzene, petroleum naptha, s-trichlorobenzene, a mineral oil fraction, xylene, or other hydrocarbon solvent, halogen-substituted hydrocarbon solvent, or equivalent. Solvents having normal boiling points up to about 250° C. are generally suitable.

Where water and hydrogen chloride are to be volatilized with solvent from the reaction mixture after the hydrolysis has been completed, the solvent is so selected that it is one that forms a ternary azeotrope with water and hydrogen chloride or, alternatively, one which enhances the volatility of water and hydrogen chloride together from mixtures comprising the same. Where the solvent and water and hydrogen chloride together are to be volatilized from the hydrolysis product, a particularly suitable solvent is chlorobenzene, although other solvents may be employed, such as petroleum naphtha.

Where the hydrolysis is to be carried out and followed by intervening separation of a solution or suspension of trichloromethanephosphonic acid in an aqueous hydrochloric acid solution, carbon tetrachloride is the preferred solvent, although other water-immiscible inert solvents for trichloromethanephosphonic dichloride distilling in the presence of water, preferably between about 40° C. and about 98–99° C. (i. e., up to slightly below the boiling point of water itself) can be used.

The solution of trichloromethanephosphonic dichloride which is employed in the process of the invention conveniently may contain between about 5 and about 25% by weight of trichloromethanephosphonic dichloride, although these limits are not highly critical. The maximum limit is subject, of course, to the solubility limit of trichloromethanephosphonic dichloride in the particular solvent. With suitable solvents solutions as concentrated as, say, 50% by weight can be employed.

The amount of water employed for the hydrolysis should be at least equal to the stoichiometric requirement of the reaction; that is to say, there should be employed at least two mole proportions of water for each mole proportion of the trichloromethanephosphonic dichloride. The water preferably is employed in excess based upon the molar amount of trichloromethanephosphonic dichloride, although it is desirable to avoid excessive dilution with water. A suitable upper limit to the amount of water employed is about 50 moles per mole of trichloromethanephosphonic dichloride. As the hydrolysis continues, hydrogen chloride formed by the reaction dissolves in the water to form aqueous hydrochloric acid. The amount of water preferably should be such an amount that there ultimately is generated in this manner an aqueous solution of hydrogen chloride containing between about 20 and about 30% by weight HCl based upon the combined weight of water and HCl. When the hydrolysis is to be followed by volatilization of part of the organic solvent, water and hydrogen chloride to yield a solution of trichloromethanephosphonic acid in the remaining solvent, there advantageously may be employed from about 4 to about 10 to 15 molar proportions of water based upon the trichloromethanephosphonic dichloride. Where the hydrolysis is to be followed by separation of solvent to leave an aqueous solution or suspension comprising hydrochloric acid and trichloromethanephosphonic acid, there advantageously may be employed from about 5 to about 25 moles of water per mole of trichloromethanephosphonic dichloride.

The hydrolysis of trichloromethanephosphonic dichloride in solution in the organic solvent therefor takes place readily at temperatures within the range of from about 50° C. up to about 200° C. A preferred range of temperature is from about 75° C. to about 120° C., which enables the process to be conducted either at atmospheric pressures or at pressures only slightly above atmospheric. The progress of the reaction can be easily followed by measurement of the amount of liberated HCl, two molecules of HCl being liberated for each molecule of trichloromethanephosphonic acid formed from trichloromethanephosphonic dichloride. The hydrolysis is continued until substantially complete as shown by measurement of the liberated HCl or by equivalent test. The reaction time will in general be between about 1 and about 6 hours.

Any suitable equipment may be employed, such as a heated kettle provided with a condenser arranged for total refluxing (where it is desired to retain all of the organic solvent in the reaction mixture throughout the hydrolysis) or arranged for fractionation (where it may be desired to withdraw solvent during the course of the reaction). The reaction mixture preferably is stirred during the reaction so as to increase the contact between the two inhomogeneous phases. Any suitable stirring device may be employed for the purpose. If it is desired only to have as the product trichloromethanephosphonic acid monohydrate, water-immiscible organic solvent remaining in the reaction mixture at the termination of the hydrolysis is removed as by phase separation, decantation, or volatilization, to leave a solution of trichloromethanephosphonic acid monohydrate in the concentrated hydrochloric acid solution (20–30% by weight) generated by the hydrolysis. Cooling of this solution to room temperatures or below causes trichloromethanephosphonic acid monohydrate to crystallize out, producing a slurry of trichloromethanephosphonic acid monohydrate in the concentrated aqueous hydrochloric acid. The crystals can be separated from the slurry and washed or dried to remove adhering traces of the mother liquor.

One of the important features of the invention, as indicated previously herein, is a method for generating or recovering the anhydrous acid, CCl₃P(O)(OH)₂, from trichloromethanephosphonic acid monohydrate and aqueous mixtures containing the same.

It has been found that this can be accomplished, without occurrence of the anhydridization reaction that was encountered in the prior art, by heating trichloromethanephosphonic acid monohydrate and aqueous mixtures comprising the same, in admixture with a volatile, liquid, preferably water-immiscible, water-entraining agent and volatilizing a vaporous mixture comprising water and the water-entraining agent from the mixture containing the trichloromethanephosphonic acid monohydrate until there remains a suspension, slurry, or solution of anhydrous trichloromethanephosphonic acid in the water-entraining agent.

Although it is not intended to be bound by any theory, it is believed that the water-entraining agent, by enhancing the volatility of water from the mixture, favors displacement of an equilibrium between trichloromethanephosphonic acid monohydrate, on the one hand, and the anhydrous acid and water on the other hand, in the direction of dehydration of the monohydrate. By volatilizing water from the system in the presence of and together with a portion of the volatile entraining agent the monohydrate can be easily, rapidly, and quantitatively converted to the anhydrous acid without occurrence of the reaction heretofore encountered leading to formation of the acid anhydride. It is believed that the invention provides for the first time a method whereby the monohydrate can be converted to the anhydrous acid.

In one method of preparing anhydrous trichloromethanephosphonic acid according to the invention, trichloromethanephosphonic acid monohydrate prepared by any desired method may be mixed with the volatile, liquid, water-entraining agent and the resulting mixture heated so as to volatilize concurrently water and a part of the liquid water-entraining agent until there remains a suspension, dispersion, slurry, or solution of anhydrous trichloromethanephosphonic acid in the remaining part of the added water-entraining agent. The trichloromethanephosphonic acid monohydrate may be mixed as such with the water-entraining agent or it may be charged in the form of an aqueous solution or suspension. After completion of the dehydration the remaining mixture of anhydrous trichloromethanephosphonic acid and water-entraining agent may be treated by appropriate methods, such as filtering (where the mixture is a suspension or slurry) or by cooling to induce crystallization followed by filtration (where the mixture is a solution), to separate from it the anhydrous trichloromethanephosphonic acid.

In another method of preparing anhydrous trichloromethanephosphonic acid according to the invention, the hydrolysis product prepared from trichloromethanephosphonic dichloride according to the method of the invention and comprising trichloromethanephosphonic acid monohydrate and concentrated aqueous hydrochloric acid, may be admixed with a liquid, volatile, preferably water-immiscible, water-entraining agent and the resulting mixture heated to volatilize both the water and hydrogen chloride together with a part of the added entraining agent. In the practice of the invention according to this embodiment there may be employed either the crude hydrolysis mixture remaining upon removal of the organic solvent that was used during the hydrolysis or the moist crystals of trichloromethanephosphonic acid monohydrate that are obtained upon cooling and filtering this initial product.

According to a third method of preparing anhydrous trichloromethanephosphonic acid according to the invention, the solvent that is employed during the hydrolysis of trichloromethanephosphonic dichloride and the water-entraining agent that is employed for effecting dehydration may be the same material. In this manner, the two steps may be carried out more or less concurrently, as by heating the organic solvent solution of trichloromethanephosphonic dichloride with water while driving off water and HCl, together with a part of the solvent, thereby leaving ultimately a solution or suspension consisting essentially of anhydrous trichloromethanephosphonic acid and the remaining portion of the added solvent or water-entraining agent.

The distillation to convert trichloromethanephosphonic acid monohydrate to the anhydrous acid preferably is carried out at temperatures between about 50° C. and about 150° C., according to the vapor pressure over the mixture and the pressure under which the dehydration is carried out. The dehydration temperature most advantageously will be between about 90° C. and about 140° C. Atmospheric pressures conveniently are employed, although the dehydration in the presence of the added water-entraining agent can be carried out under reduced pressures as well as under pressures slightly above atmospheric pressure. The amount of water-entraining agent to be used will depend, of course, in part upon the amount of water in the mixture to be dehydrated and also in part upon the composition of the vapors leaving the mixture that is being dehydrated. Where large quantities of materials are involved there preferably is employed a water-immiscible water-entraining agent; the evolved vapors are condensed, the two-phase condensate is allowed to stratify, the aqueous phase is removed from the system and the organic phase comprising the water-entraining agent is recycled or run back to the distillation vessel.

As the water-entraining agent there are employed volatile, inert, preferably water-immiscible, organic liquids that enhance the volatility of water compared to its volatility in an ideal solution and that have normal boiling points preferably above the normal boiling point of water. The enhancement of volatility may be brought about by formation of a true azeotropic mixture comprising the water-entraining agent and water, as occurs with toluene, n-butyl alcohol, sec-butyl alcohol and monochlorobenzene, or it may be brought about by action of the water-entraining agent upon the activity coefficient of water without the formation of a true azeotrope, as with petroleum naphtha and other paraffinic hydrocarbons. The water-entraining agent preferably should have a normal boiling point between about 100° C. and about 210° C. Liquids which can be employed include, among others, phenol, formic acid, cresols, acetic acid, propionic acid, butyric acid, valeric acid, toluene, xylene, aromatic fractions from petroleum or coal tars, $C_8$, $C_9$ and $C_{10}$ paraffinic hydrocarbon fractions, alkyl halides, such as amyl chloride, and aliphatic alcohols, such as t-butyl alcohol, the amyl alcohols and their homologs. Because of their availability, their inertness and their effectiveness the preferred water-entraining agents are the hydrocarbons and halogen-substituted hydrocarbons, preferably chlorine-substituted hydrocarbons.

Although various water-entraining agents having the foregoing characteristics can be employed for effecting dehydration of trichloromethanephosphonic acid monohydrate according to the invention, it has been found that monochlorobenzene is particularly suitable as the water-entraining agent, whether solid trichloromethanephosphonic acid monohydrate as such is to be dehydrated or an aqueous hydrolysis product produced according to the invention is to be dried so as to recover anhydrous trichloromethanephosphonic acid therefrom. The outstanding suitability of monochlorobenzene is due in part to the fact that it possesses such volatility characteristics that distillation of mixtures comprising it and water, HCl and trichloromethanephosphonic acid monohydrate leads to efficient separation of water and HCl from the trichloromethanephosphonic acid and generation of substantially pure anhydrous trichloromethanephosphonic acid as the dehydration product. Trichloromethanephosphonic acid in both the anhydrous and the hydrous states has been found to be remarkably stable in solution in monochlorobenzene. Furthermore, the solubility characteristics of trichloromethanephosphonic acid in monochlorobenzene have been found to be such that when the distillation is conduted at normal pressures anhydrous trichloromethanephosphonic acid is highly soluble in, and even completely miscible with, monochlorobenzene. However, at normal temperatures, i. e., room temperatures, anhydrous trichloromethanephosphonic acid is only slightly soluble in monochlorobenzene. This means that after removing the water and HCl by distillation conjointly with monochlorobenzene, there will remain at the distillation temperature a clear, mobile solution of anhydrous trichloromethanephosphonic acid in monochlorobenzene, which can be easily withdrawn from the distillation equipment. Upon cooling of this solution, the anhydrous trichloromethanephosphonic acid precipitates or crystallizes in virtually quantitative yields, for most purposes any further purification being wholly unnecessary. Because of the chemical stability of solutions of trichloromethanephosphonic acid in monochlorobenzene, the mother liquor from the precipitation or crystallization can be reutilized with a minimum of purification in the dehydration of further quantities of trichloromethanephosphonic acid monohydrate. When monochlorobenzene is employed as the water-entraining agent, there conveniently may be employed upwardly from about one part by weight per part of trichloromethanephosphonic acid monohydrate, the maximum amount, of course, depending upon whether the distillate is stratified and the organic phase refluxed or recycled to the distillation equipment. The amount of monochlorobenzene remaining after the water or water and HCl have been expelled may be sufficient to form a clear homogeneous solution of anhydrous trichloromethanephosphonic acid or lesser amounts, calculated to lead to a slurry of solid trichloromethanephosphonic acid (anhydrous) in a saturated solution of trichloromethanephosphonic acid in the solvent, may be employed. The trichloromethanephosphonic acid may be recovered from this solution or slurry by conventional methods, such as by cooling to induce crystallization coupled with filtration and drying of the crystals.

The following examples will illustrate various specific embodiments of the invention. It will be appreciated, of course, that the invention should not be misconstrued as being limited to the particular embodiments shown in the examples.

*Example I*

A solution of 563 grams trichloromethanephosphonic dichloride in 3427 grams carbon tetrachloride was placed in a 5-liter 4-necked glass flask equipped with a mechanical stirrer, dropping funnel, thermometer well and distillation head and heated to reflux. Thirty-eight grams of water was slowly added. After refluxing for 2½ hours, an additional 1000 grams of water was added and thereafter the carbon tetrachloride was distilled from the mixture over a period of 4 hours, 50 minutes. The mixture then was refluxed for an additional period until the amount of HCl liberated indicated completion of the reaction. There was obtained a virtually quantitative yield of trichloromethanephosphonic acid monohydrate.

*Example II*

To a 100-gallon Pfaudler kettle equipped with an overhead distillation system, distillate accumulator and vacuum connection there was charged 150 pounds of water. The still was heated to 85–95° C. and then to it was added a 16% by weight solution of 105 pounds of trichloromethanephosphonic dichloride in carbon tetrachloride at the rate of 100–125 pounds per hour. Carbon tetrachloride was distilled from the mixture as the trichloromethanephosphonic dichloride solution was added so that most of it had been removed by the time the hydrolysis was completed. The kettle contents then was heated at about 115° C. until chemical analysis showed the reaction to be complete. The resulting mixture was cooled to room temperature and trichloromethanephosphonic acid monohydrate was recovered as a white crystalline solid by filtration of the resulting slurry. The mother liquor was concentrated to about one-half its original volume under reduced pressure and on filtration gave a second crop of crystals which was combined with the first. There was obtained 93 pounds of moist trichloromethanephosphonic acid monohydrate. The remaining mother liquor contained an estimated 10–15 pounds of monohydrate which could be recovered by evaporation and further crystallization.

*Example III*

To a Pfaudler kettle equipped with a mechanical stirrer and a phase-separating stillhead there were charged 999 parts of chlorobenzene and 418 parts by weight of a slurry of trichloromethanephosphonic acid monohydrate in aqueous hydrochloric acid, obtained as the crude hydrolysis product in a run conducted as in Example II. The mixture was heated, with stirring, at 56–68° C. under 100 mm. pressure, while distilling a vaporous mixture of monochlorobenzene, HCl and water. After all the water and HCl had been expelled, the remaining slurry of anhydrous trichloromethanephosphonic acid in a saturated solution of trichloromethanephosphonic acid in chlorobenzene was withdrawn from the kettle, cooled and filtered. The trichloromethanephosphonic acid (anhydrous) was recovered as a free-flowing white powder which contained not over 0.0003 equivalent HCl/100 grams. The molecular weight of the product was found to be 199.88 compared to a calculated molecular weight of 199.5.

*Example IV*

To a 200 part by weight sample of moist crystalline trichloromethanephosphonic acid monohydrate prepared as in Example II there was added 999 parts by weight of monochlorobenzene. The resulting mixture was heated at 110–130° C. under atmospheric pressure while distilling off a ternary mixture of monochlorobenzene, water and HCl. The resulting slurry then was cooled and filtered and the crystals were dried. The product was crystalline and free flowing and contained no measurable hydrochloric acid. It was found to have a molecular weight of 202.8 compared to a calculated molecular weight of 199.5 for $CCl_3P(O)(OH)_2$.

*Example V*

The stability of anhydrous trichloromethanephosphonic acid in chlorobenzene was shown by refluxing a solution thereof (128–131.5° C.) for 8 hours and then separating the acid from the solvent. The melting point of the recovered acid was unchanged and a potentiometric titration showed a molecular weight of 201.4 compared to the calculated molecular weight of 199.5. The following values have been obtained for the solubility of anhydrous trichloromethanephosphonic acid in monochlorobenzene:

| Temperature, ° C. | Percent w. Trichloromethanephosphonic Acid in Chlorobenzene |
| --- | --- |
| 82 | 0.99 |
| 98 | 1.96 |
| 108 | 2.91 |
| 114 | 3.84 |
| 118 | 5.66 |
| 120 | 9.09 |
| 130 | miscible |

*Example VI*

To a 300-gallon jacketed autoclave there are charged a solution of 330 pounds of trichloromethanephosphonic dichloride in carbon tetrachloride and 500 pounds of water. The mixture is heated at 104° C. until analyses show the theoretical amount of HCl has been liberated and then is discharged to a phase separator. The separated aqueous layer containing the trichloromethanephosphonic acid monohydrate is charged to a still kettle equipped with mechanical stirrer and 280 pounds of petroleum naphtha is added. The mixture is distilled to drive off water, HCl and naphtha, with condensation of the evolved vapors, phase separation and return of the naphtha phase to the still kettle. The distillation is continued in this manner until all of the water and HCl have been removed. The remaining slurry of anhydrous trichloromethanephosphonic acid in petroleum naphtha then is withdrawn and filtered and the moist crystals are dried. The yield of anhydrous trichloromethanephosphonic acid is approximately 95%, based upon the amount of trichloromethanephosphonic dichloride charged.

I claim as my invention:

1. Anhydrous, crystalline, solid trichloromethanephosphonic acid having the chemical formula $CCl_3P(O)(OH)_2$ and melting at substantially 163.2° C.

2. A method for preparing trichloromethanephosphonic acid monohydrate which comprises mixing and reacting with each other at a temperature of from about 50° C. to about 200° C. at least two molar proportions of water and a solution of one molar proportion of trichloromethanephosphonic dichloride in an inert water-immiscible organic solvent therefor.

3. A method for preparing trichloromethanephosphonic acid monohydrate which comprises heating at a temperature of from about 50° C. to about 200° C. an inhomogeneous mixture comprising at least two molar proportions of water and a solution of one molar proportion of trichloromethanephosphonic dichloride in an inert water-immiscible organic solvent therefor.

4. A method defined by claim 3 in which the solvent is a halogen-substituted hydrocarbon.

5. A method defined by claim 4 in which the solvent is carbon tetrachloride.

6. A method defined by claim 4 in which the solvent is monochlorobenzene.

7. A method for preparing trichloromethanephosphonic acid monohydrate by hydrolysis of trichloromethanephosphonic dichloride wherein the hydrolysis is conducted at least initially in an inhomogeneous mixture comprising an aqueous phase and a second phase immiscible therewith and comprising a solution of trichloromethanephosphonic dichloride in an inert water-immiscible organic solvent for trichloromethanephosphonic dichloride.

8. A method defined by claim 7 in which the solvent is a volatile organic solvent that forms a minimum-boiling ternary azeotrope with water and hydrogen chloride.

9. A method defined by claim 8 in which the solvent is monochlorobenzene.

10. A method defined by claim 7 in which the solvent is carbon tetrachloride.

11. A method for preparing trichloromethanephosphonic acid which comprises hydrolyzing trichloromethanephosphonic dichloride by reaction in an inert water-immiscible organic solvent therefor with water to produce a hydrolysis product comprising trichloromethanephosphonic acid monohydrate, water and hydrogen chloride and expelling water and hydrogen chloride from the said hydrolysis product by conjoint volatilization with an added volatile water-immiscible organic solvent that enhances the volatility of water and hydrogen chloride from aqueous mixtures comprising the same.

12. A method for preparing trichloromethanephosphonic acid which comprises hydrolyzing by reaction with water trichloromethanephosphonic dichloride in solution in an inert water-immiscible volatile organic solvent for trichloromethanephosphonic dichloride, separating said solvent from the aqueous hydrolysis product, adding to the aqueous hydrolysis product comprising trichloromethanephosphonic acid monohydrate, water and hydrogen chloride a water-immiscible volatile organic solvent that enhances the volatility of water and hydrogen chloride from aqueous mixtures comprising the same and expelling water and hydrogen chloride from the resulting mixture by conjoint volatilization with the added solvent until there remains an essentially anhydrous mixture comprising anhydrous trichloromethanephosphonic acid.

13. A method defined by claim 12 in which the first-mentioned solvent is carbon tetrachloride.

14. A method defined by claim 12 in which the second-mentioned solvent is monochlorobenzene.

15. A method for the preparation of anhydrous trichloromethanephosphonic acid which comprises heating a mixture comprising a dispersion of trichloromethanephosphonic acid monohydrate and an excess of a normally liquid, volatile, inert organic, water-entraining agent and expelling water therefrom by conjoint volatilization with the water-entraining agent until there remains a dispersion of anhydrous trichloromethanephosphonic acid in the remaining portion of the water-entraining agent.

16. A process defined by claim 15 in which the water-entraining agent is monochlorobenzene.

17. A method of recovering anhydrous trichloromethanephosphonic acid from an aqueous mixture comprising trichloromethanephosphonic acid monohydrate and HCl which comprises adding to the mixture a normally liquid, volatile, inert organic, water-immiscible, water-entraining agent and expelling water and HCl from the resulting mixture by conjoint volatilization with the water-entraining agent until there remains essentially a mixture of anhydrous trichloromethanephosphonic acid and said water-entraining agent.

18. A method of removing the water of hydration from trichloromethanephosphonic acid monohydrate initially present in admixture with water and HCl which comprises volatilizing the water and the HCl from the mixture conjointly with added monochlorobenzene present throughout the volatilization until there remains essentially a dispersion of anhydrous trichloromethanephosphonic acid in monochlorobenzene.

19. A method of preparing crystalline anhydrous trichloromethanephosphonic acid from a mixture initially comprising trichloromethanephosphonic acid monohydrate and aqueous hydrochloric acid solution which comprises heating a mixture comprising trichloromethanephosphonic acid monohydrate, aqueous hydrochloric acid solution and monochlorobenzene to volatilize water and hydrogen chloride together with a part of the monochlorobenzene, continuing the volatilization until there remains essentially an anhydrous solution of trichloromethanephosphonic acid in monochlorobenzene, cooling the solution to precipitate anhydrous trichloromethanephosphonic acid therefrom, and separating the mother liquor from the precipitated solid.

References Cited in the file of this patent
Yakubovich et al.: Chem. Abstracts, vol. 47, 2685 (1953).